United States Patent
Higo et al.

(10) Patent No.: US 12,077,420 B2
(45) Date of Patent: Sep. 3, 2024

(54) TRANSPORT DEVICE, CONTROL METHOD, AND COMPUTER PROGRAM PRODUCT

(71) Applicant: KABUSHIKI KAISHA TOSHIBA, Tokyo (JP)

(72) Inventors: Ryosuke Higo, Kawasaki Kanagawa (JP); Hideichi Nakamoto, Setagaya Tokyo (JP); Hiroshi Takahashi, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 675 days.

(21) Appl. No.: 17/184,385

(22) Filed: Feb. 24, 2021

(65) Prior Publication Data

US 2022/0073329 A1 Mar. 10, 2022

(30) Foreign Application Priority Data

Sep. 7, 2020 (JP) .................. 2020-149819

(51) Int. Cl.
*B66F 9/075* (2006.01)
*B62D 57/028* (2006.01)
*B62D 61/12* (2006.01)

(52) U.S. Cl.
CPC ........ *B66F 9/07586* (2013.01); *B62D 57/028* (2013.01); *B62D 61/12* (2013.01)

(58) Field of Classification Search
CPC ............. B66F 9/07586; B66F 9/07559; B62D 57/028; B62D 61/12
See application file for complete search history.

(56) References Cited

U.S. PATENT DOCUMENTS

| 6,027,303 A * | 2/2000 | Voegeli ..................... B66F 9/10 |
| | | 414/667 |
| 2020/0307974 A1* | 10/2020 | Hasegawa ............. B66F 17/003 |
| 2023/0227089 A1* | 7/2023 | Zonzini ................... B62B 5/023 |
| | | 280/5.22 |

FOREIGN PATENT DOCUMENTS

| JP | 2006-190105 A | 7/2006 |
| JP | 3207541 U | 11/2016 |

* cited by examiner

*Primary Examiner* — Brian P Sweeney
(74) *Attorney, Agent, or Firm* — Finnegan, Henderson, Farabow, Garrett & Dunner, LLP

(57) ABSTRACT

A transport device includes: a vehicle body including a fork portion that supports a load, a lift portion that drives the fork portion up and down, a movable carriage portion that supports the lift portion, and is movable on a traveling surface by driving a drive wheel, and an auxiliary leg portion that is provided in the movable carriage portion, is movable along a longitudinal direction of the fork portion, and has an auxiliary wheel having a variable position with respect to the movable carriage portion; and a control unit that, in a case where a step is present on the traveling surface, controls operations of the lift portion, the movable carriage portion, and the auxiliary leg portion such that the movable carriage portion climbs the step, based on the position of the center of gravity calculated by a calculation unit.

14 Claims, 11 Drawing Sheets

TRANSPORT DEVICE, CONTROL METHOD, AND COMPUTER PROGRAM PRODUCT

CROSS-REFERENCE TO RELATED APPLICATIONS

This application is based upon and claims the benefit of priority from Japanese Patent Application No. 2020-149819, filed on Sep. 7, 2020; the entire contents of which are incorporated herein by reference.

FIELD

Embodiments described herein relate generally to a transport device, a control method, and a computer program product.

BACKGROUND

In a transport device that transports a pallet, there is a problem that it is difficult to climb a step because the wheel diameter is small and further the torque required for the drive wheels is insufficient. On the other hand, an auxiliary tool that increases the wheel diameter of a hand pallet truck has been proposed. However, since a fork portion cannot be inserted into the pallet in a state where the auxiliary tool is mounted, it is necessary to remove the auxiliary tool when placing the pallet, which is troublesome. Further, although a movable robot that selects a transfer method according to a step has been proposed, this mechanism cannot be applied to a pallet truck as it is.

Therefore, there is a demand for a transport device that can smoothly climb a step.

DETAILED DESCRIPTION

According to an embodiment, a transport device includes a vehicle body, a calculation unit, and a control unit. The vehicle body includes a fork portion, a lift portion a movable carriage portion, and an auxiliary leg portion. The fork portion supports a load. The lift portion drives the fork portion up and down. The movable carriage portion supports the lift portion, and is movable on a traveling surface by driving a drive wheel. The auxiliary leg portion is provided in the movable carriage portion, is movable along a longitudinal direction of the fork portion, and has an auxiliary wheel having a variable position with respect to the movable carriage portion. The calculation unit calculates a position of a center of gravity of the vehicle body that is transporting the load. The control unit, in a case where a step is present on the traveling surface, controls operations of the lift portion, the movable carriage portion, and the auxiliary leg portion such that the movable carriage portion climbs the step, based on the position of the center of gravity calculated by the calculation unit.

Hereinafter, a transport device of an embodiment will be described in detail with reference to the accompanying drawings. In the schematic views of the attached drawings, it should be noted that each part constituting the transport device is illustrated in a simplified manner in consideration of the legibility of the drawings, so that the shape, dimensions, arrangement, and the like of each part are not always accurately illustrated.

Figure 1:
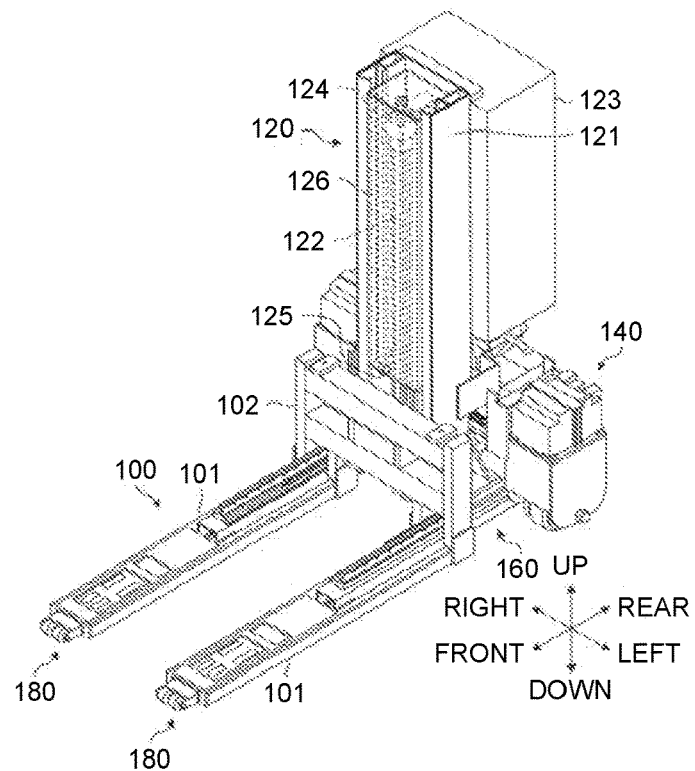
FIG. 1 is a perspective view illustrating an overall configuration of a transport device according to an embodiment.
Figure 2:
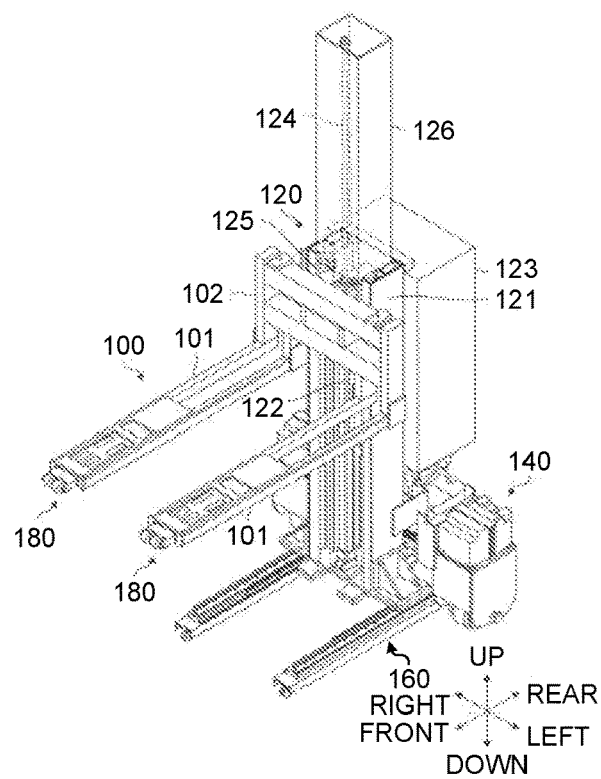
FIG. 2 is a perspective view illustrating the overall configuration of the transport device according to the embodiment.

First, a mechanical configuration of the transport device of the embodiment will be described. FIGS. 1 and 2 are perspective views illustrating the overall configuration of the transport device according to the embodiment. As illustrated in FIGS. 1 and 2, the transport device of the embodiment includes a fork portion 100, a lift portion 120, a movable carriage portion 140, an auxiliary leg portion 160, and a distal end support mechanism portion 180. The front-rear, left-right, and up-down directions of the transport device are as illustrated in the drawings.

The fork portion 100 supports a load (a pallet and a loaded object loaded on the pallet) transported by the transport device, and is configured such that a pair of left and right claws 101 are held by a holder 102. The distal end side of each of the pair of claws 101 in a longitudinal direction is located on the front side of the transport device, and the pair of claws 101 are fixed to the holder 102 on the base end side. The holder 102 is connected to a connection member 125 described later. The interval between the pair of claws 101 is determined according to the interval between fork insertion holes of the pallet. The pair of claws 101 may have a structure attached to the holder 102 such that the interval can be adjusted.

The lift portion 120 drives the fork portion 100 up and down, and has a configuration in which a hydraulic cylinder 122 is arranged in a frame 121 erected in the up-down direction. A tank 123 that stores hydraulic oil for operating the hydraulic cylinder 122 is attached to the frame 121.

The hydraulic oil is supplied from the tank 123 by the drive of a hydraulic motor so that the internal pressure of the hydraulic cylinder 122 is increased, and this pressure pushes up a piston rod 124. The piston rod 124 is coupled to the connection member 125 to which the holder 102 of the fork portion 100 is connected, and the fork portion 100 is raised by driving the hydraulic cylinder 122 to push up the piston rod 124 (refer to FIG. 2). Further, when the hydraulic oil inside the hydraulic cylinder 122 is collected in the tank 123, the internal pressure of the hydraulic cylinder 122 is decreased, the piston rod 124 is pushed down by the weight of the fork portion 100, and the fork portion 100 is lowered (refer to FIG. 1).

A tubular protective cover 126 that is moved integrally with the piston rod 124 is provided above the connection member 125, the circumference of the piston rod 124 pushed up by the drive of the hydraulic cylinder 122 is covered with the protective cover 126, and as a result, the piston rod 124 is protected (refer to FIG. 2).

Figure 3:
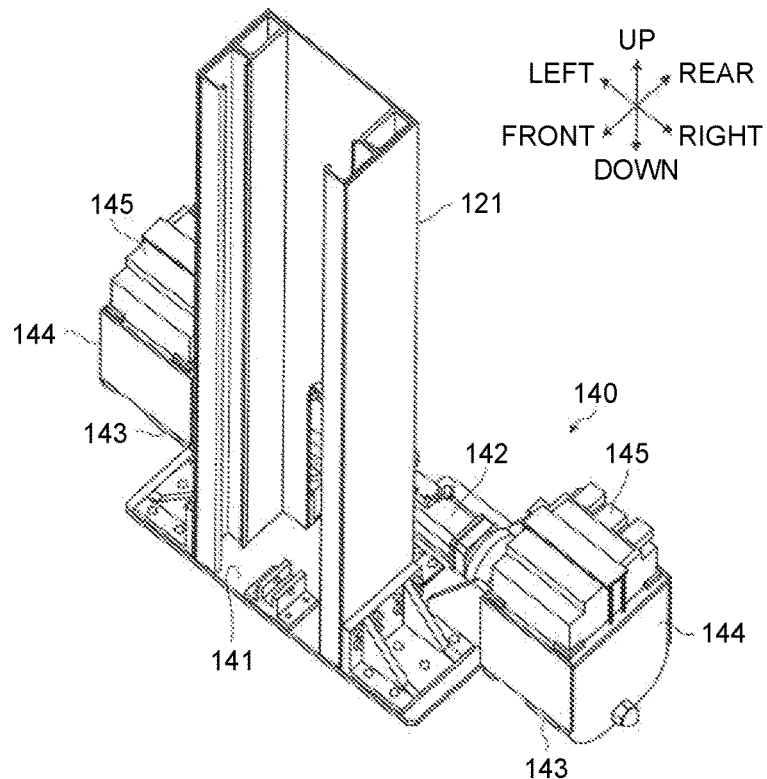
FIG. 3 is a perspective view illustrating details of a movable carriage portion.

The movable carriage portion 140 is a moving body that supports the lift portion 120. The details of the movable carriage portion 140 are illustrated in FIG. 3. As illustrated in FIG. 3, the movable carriage portion 140 has a pedestal 141 to which the frame 121 of the lift portion 120 is fixed, a pair of drive motors 142 arranged on the pedestal 141, and a pair of left and right drive wheels 143 respectively connected to the output shafts of the pair of drive motors 142 via a speed reducer. By controlling the pair of drive motors 142 to drive the pair of left and right drive wheels 143, the movable carriage portion 140 can move straight or turn on a traveling surface.

The upper sides of the pair of left and right drive wheels 143 are covered with wheel covers 144 fixed to the pedestal 141, respectively. A battery 145 used as a power source for the entire transport device is arranged on the wheel cover 144. Thereby, the horizontal projected area of the movable carriage portion 140 can be reduced.

Figure 4A:
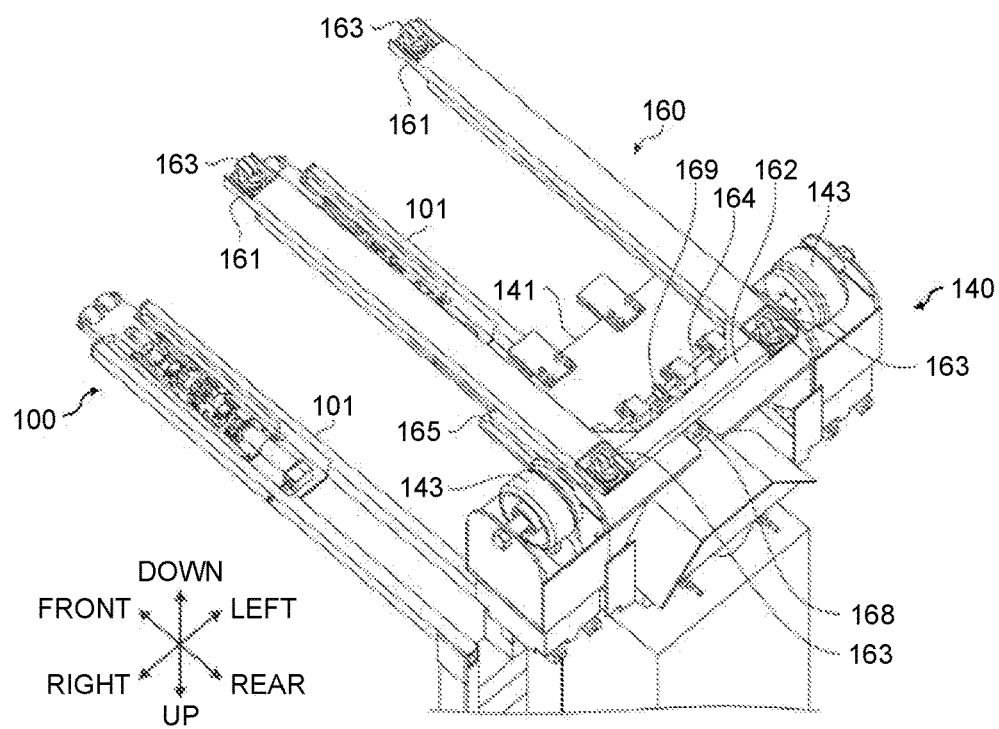
FIG. 4A is a perspective view illustrating details of an auxiliary leg portion.
Figure 4B:
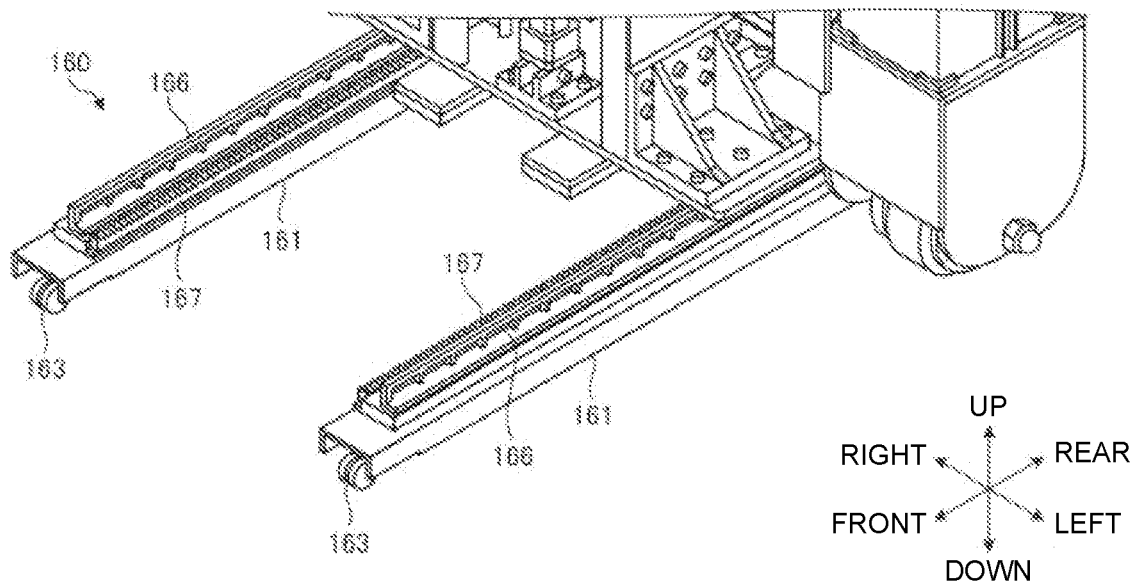
FIG. 4B is a perspective view illustrating details of the auxiliary leg portion.
Figure 4C:
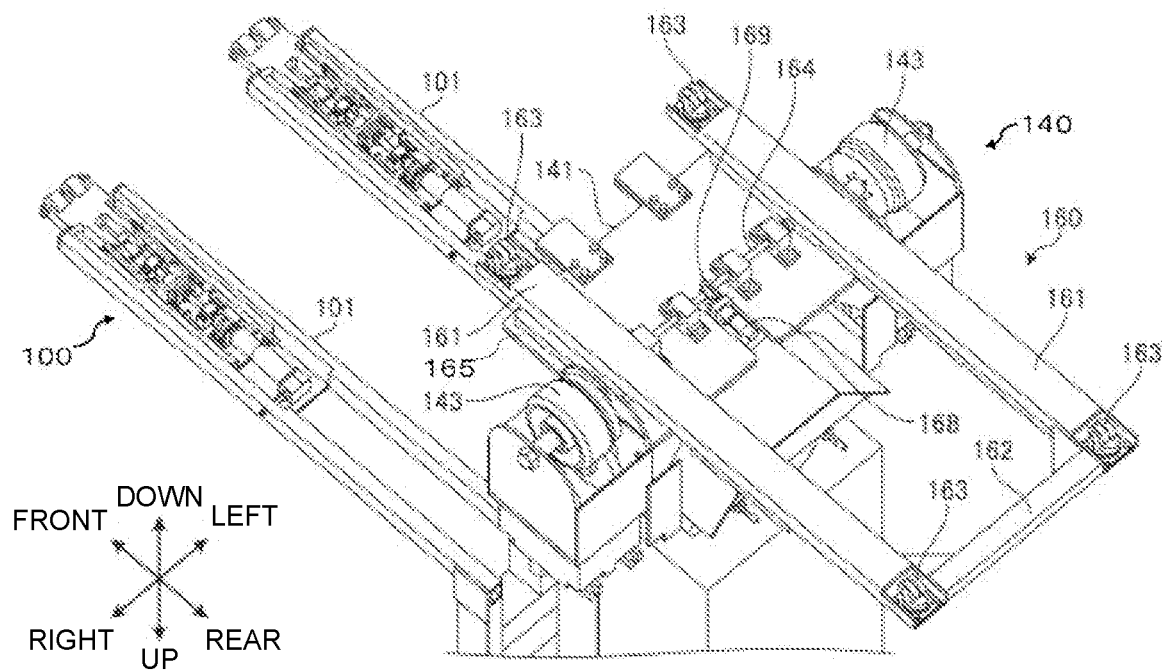
FIG. 4C is a perspective view illustrating details of the auxiliary leg portion.

The auxiliary leg portion 160 is a structure that is coupled to the movable carriage portion 140 so as to be movable along the longitudinal direction (that is, the front-rear direction of the transport device) of the claw 101 of the fork portion 100. The details of the auxiliary leg portion 160 are illustrated in FIGS. 4A to 4C. FIGS. 4A and 4C illustrate the auxiliary leg portion 160 viewed from the lower side of the transport device, and FIG. 4B illustrates the auxiliary leg portion 160 viewed from the upper side of the transport device.

As illustrated in FIGS. 4A and 4C, the auxiliary leg portion 160 has a structure in which a pair of left and right auxiliary legs 161 are coupled by a coupling portion 162. The auxiliary leg portion 160 is configured such that the interval between the pair of left and right auxiliary legs 161 is substantially equal to the interval between the pair of claws 101 of the fork portion 100, and the auxiliary leg portion 160 is arranged on the back surface side of the pedestal 141 of the movable carriage portion 140 (opposite to the surface to which the frame 121 of the lift portion 120 is fixed) such that the pair of auxiliary legs 161 overlap with the pair of claws 101 when viewed from the up-down direction.

Auxiliary wheels 163 that come into contact with the traveling surface is provided closer to the distal ends (closer to the front of the transport device) closer to the base ends, which are connected to the coupling portion 162 (closer to the rear of the transport device), on the pair of auxiliary legs 161. The auxiliary leg portion 160 has a role of distributing and supporting the load of the transport device without concentrating the load on the drive wheels 143 of the movable carriage portion 140 by causing the four auxiliary wheels 163 to come into contact with the traveling surface. The auxiliary wheels 163 that come into contact with the traveling surface may be provided at least closer to the distal ends thereof (closer to the front) on the pair of auxiliary legs 161, and the auxiliary wheels 163 closer to the base ends thereof (closer to the rear) on the pair of auxiliary legs 161 may be configured to not come into contact with the traveling surface.

Further, it is desirable that the auxiliary leg portion 160 includes a brake mechanism that suppresses the rotation of the auxiliary wheels 163. For example, a brake module configured to suppress the rotation of the auxiliary wheels 163 by pressing a friction plate that is moved by electromagnetic force against a disc fixed to the rotation shaft of the auxiliary wheels 163 may be mounted on the auxiliary leg portion 160.

A rotary shaft 164 with pinions (gears) attached to both ends are arranged on the back surface side of the pedestal 141 of the movable carriage portion 140, along the left-right direction of the transport device. Further, a linear motion (LM) block 165 which is located near both ends of the rotary shaft 164 and engages with a linear rail 166 described later, is arranged on the back surface side of the pedestal 141. On the other hand, as illustrated in FIG. 4B, the linear rails 166 and racks 167 that engage with the pinions (gears) attached to the both ends of the rotary shaft 164 are provided to the pair of auxiliary legs 161 of the auxiliary leg portion 160, along the longitudinal direction (the front-rear direction of the transport device).

The rotary shaft 164 arranged on the back surface side of the pedestal 141 is rotated by transmitting the power of an auxiliary leg moving motor 168 via a worm wheel 169. The rotation of the rotary shaft 164 is converted into the linear motion of the auxiliary leg portion 160 by the racks 167, and the auxiliary leg portion 160 is moved in the front-rear direction by being guided by the LM block 165 and the linear rails 166.

That is, the auxiliary leg moving motor 168 is controlled to move the auxiliary leg portion 160 in the front-rear direction as illustrated in FIGS. 4A and 4C, so that the positions of the auxiliary wheels 163, which are in contact with the traveling surface, relative to the movable carriage portion 140 can be changed.

The power of the auxiliary leg moving motor 168 is transmitted to the rotary shaft 164 via the worm wheel 169, so that it is possible to effectively suppress that the auxiliary leg portion 160 is moved unexpectedly due to the external force or the like when the auxiliary leg moving motor 168 is not operated. As a result, the stability of the transport device can be improved and falling can be prevented.

The auxiliary leg portion 160 does not necessarily have to be provided in the transport device.

The distal end support mechanism portions 180 are each provided closer to the distal end on one of the pair of claws 101 of the fork portion 100, and has a mechanism capable of switching between a non-contact state with the traveling surface and a contact state with the traveling surface.

Figure 5A:
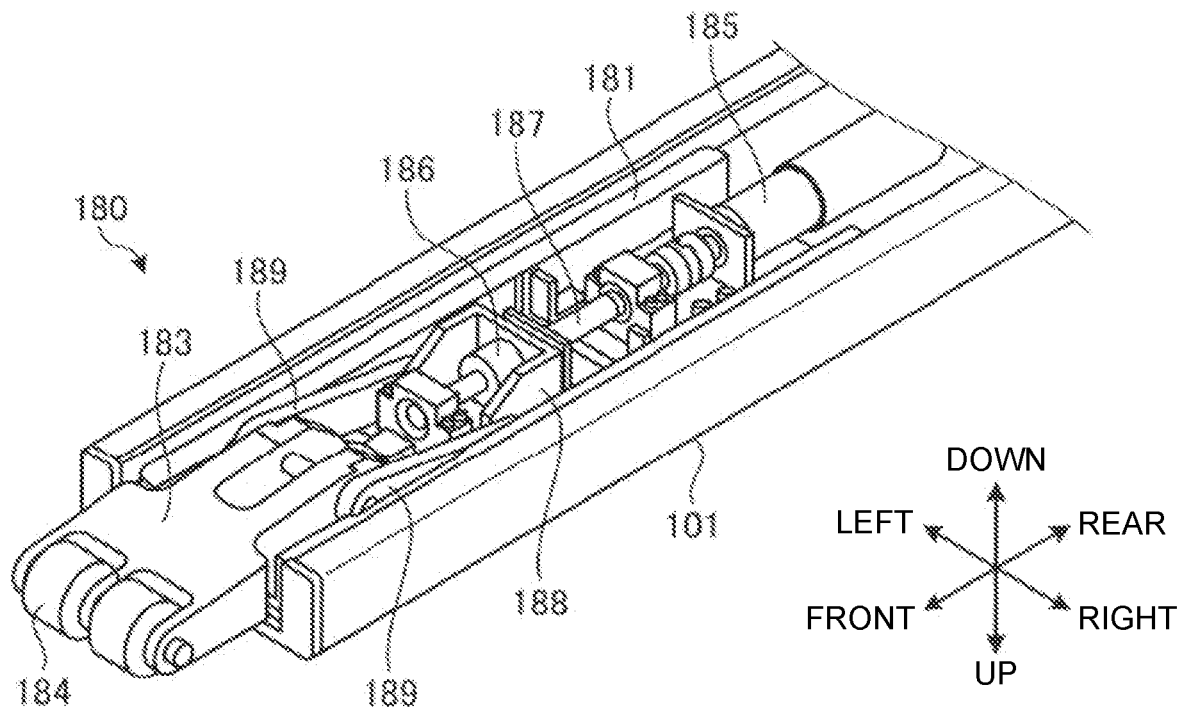
FIG. 5A is a perspective view illustrating details of a distal end support mechanism portion.
Figure 5B:
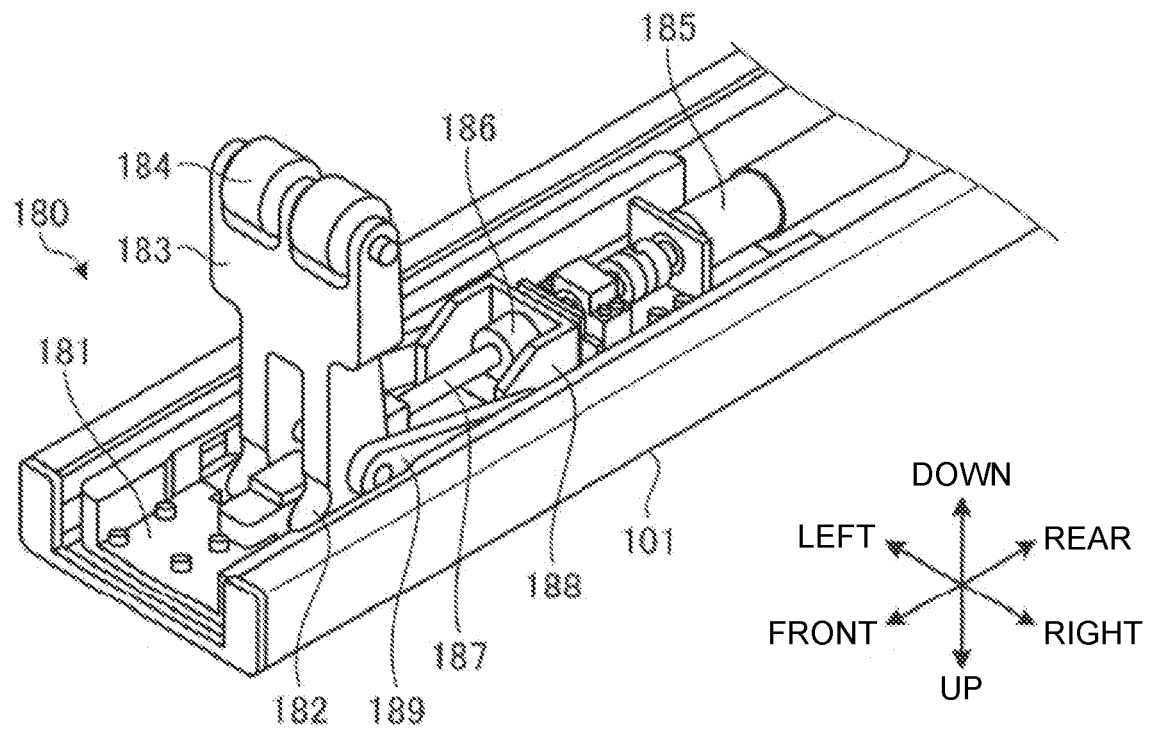
FIG. 5B is a perspective view illustrating details of the distal end support mechanism portion.

The details of the distal end support mechanism portion 180 are illustrated in FIGS. 5A and 5B. FIGS. 5A and 5B illustrate the distal end support mechanism portion 180 viewed from the lower side of the transport device.

As illustrated in FIGS. 5A and 5B, the distal end support mechanism portion 180 has a holder 181 housed on the back side of the claw 101 of the fork portion 100, and a distal end arm 183 though which a rotation shaft 182 fixed to the holder 181 is inserted at location closer to the base end of the distal end arm 183 and which is supported by the holder 181 to be rotatable around the rotation shaft 182. Wheels 184 are provided closer to the distal end on the distal end arm 183.

A ball screw 187 through which a nut 186 is inserted is coupled to the output shaft of a distal end support drive motor 185 which is a power source for rotating the distal end arm 183. A nut link 188 is fixed to the nut 186, and the nut link 188 and the distal end arm 183 are coupled via a relay link 189. The relay link 189 is connected to the nut link 188 with a free joint at a location closer to one end of the relay link 189, and is connected to the distal end arm 183 with a free joint at a location closer to the other end of the relay link 189.

When the ball screw 187 is rotated by the drive of the distal end support drive motor 185, the nut 186 and the nut link 188 are moved linearly in the axial direction of the ball screw 187. When the nut link 188 is moved linearly, its power is transmitted to the distal end arm 183 via the relay link 189, and the distal end arm 183 is rotated around the rotation shaft 182. That is, by controlling the distal end support drive motor 185, the distal end arm 183 of the distal end support mechanism portion 180 can be changed between a state where it is laid parallel to the claw 101 of the fork portion 100 as illustrated in FIG. 5A and a state where it is erected perpendicular to the claw 101 of the fork portion 100 as illustrated in FIG. 5B. In the state illustrated in FIG. 5A, the distal end arm 183 does not come into contact with the traveling surface, but in the state illustrated in FIG. 5B, the distal end arm 183 can come into contact with the traveling surface by the wheels 184.

The distal end support mechanism portion 180 does not necessarily have to be provided in the transport device.

Figure 6:
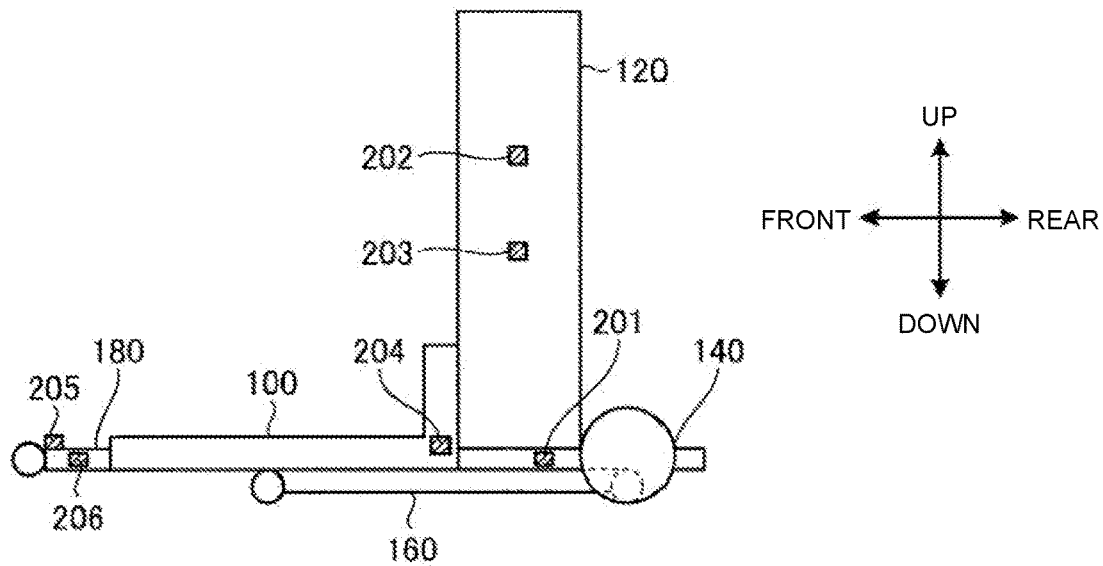
FIG. 6 is a schematic view illustrating an arrangement example of various sensors included in the transport device of the embodiment.

Next, the configuration of a control system of the transport device of the embodiment will be described. FIG. 6 is a schematic view illustrating an arrangement example of various sensors included in the transport device of the embodiment. As illustrated in FIG. 6, the transport device of the embodiment includes an acceleration sensor 201, a tilt sensor 202, a pressure sensor 203, a load sensor 204, a camera 205, and a distance sensor 206.

The acceleration sensor 201 is provided in, for example, the movable carriage portion 140, and detects acceleration and deceleration (movement acceleration/deceleration) when the movable carriage portion 140 is moved. The tilt sensor 202 is provided in, for example, the lift portion 120, and detects the tilt of the transport device.

The pressure sensor 203 indirectly detects the weight of the load supported by the fork portion 100, by detecting the internal pressure of the hydraulic cylinder 122 of the lift portion 120. The load sensor 204 is provided in the fork portion 100, and directly detects the weight of the load. The pressure sensor 203 and the load sensor 204 are examples of a load weight detection unit that detects the weight of the load supported by the fork portion 100.

The camera 205 is provided in, for example, the distal end support mechanism portion 180, and captures an image in front of the transport device. The distance sensor 206 is provided in, for example, the distal end support mechanism portion 180, and measures the distance to various objects present in front of the transport device. The image captured by the camera 205 and information on the distance measured by the distance sensor 206 are examples of forward information indicating the situation in front of the transport device, and the camera 205 and the distance sensor 206 are examples of an acquisition unit that acquires the forward information.

The positions of the various sensors illustrated in FIG. 6 are examples, and the positions where the various sensors are attached in the transport device can be changed.

Figure 7:
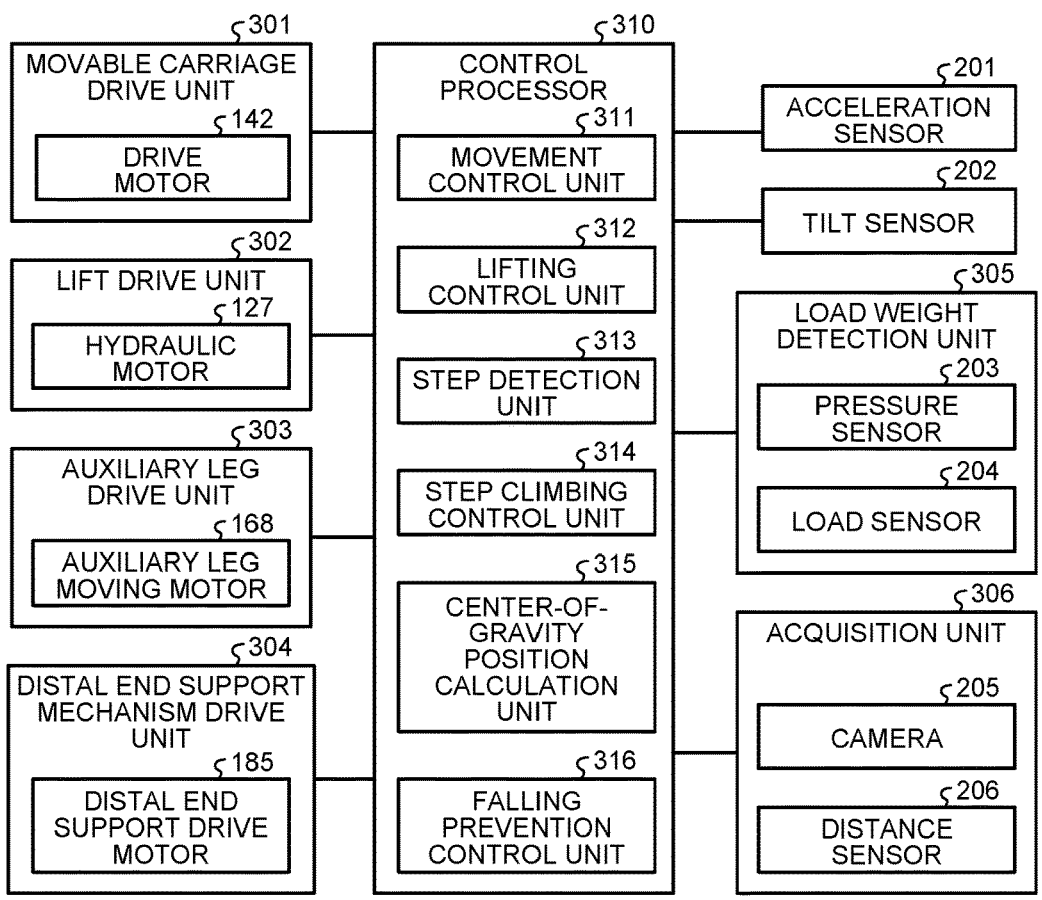
FIG. 7 is a block diagram illustrating a configuration example of a control system of the transport device of the embodiment.

FIG. 7 is a block diagram illustrating a configuration example of the control system of the transport device of the embodiment. As illustrated in FIG. 7, the control system of the transport device includes a movable carriage drive unit 301 that drives the movable carriage portion 140, a lift drive unit 302 that drives the lift portion 120, an auxiliary leg drive unit 303 that drives the auxiliary leg portion 160, a distal end support mechanism drive unit 304 that drives the distal end support mechanism portion 180, and a control processor 310 that controls the operation of each of these units. The above-described drive motor 142 is included in the movable carriage drive unit 301, the above-described hydraulic motor 127 is included in the lift drive unit 302, the above-described auxiliary leg moving motor 168 is included in the auxiliary leg drive unit 303, and the above-described distal end support drive motor 185 is included in the distal end support mechanism drive unit 304.

Each of the above-described acceleration sensor 201, the tilt sensor 202, a load weight detection unit 305 including the pressure sensor 203 and the load sensor 204, and an acquisition unit 306 including the camera 205 and the distance sensor 206 is connected to the control processor 310.

The control processor 310 is configured by using a general-purpose processor such as a central processing unit (CPU), and performs various operations according to a predetermined control program to realize various control functions such as a movement control unit 311, a lifting control unit 312, a step detection unit 313, a step climbing control unit 314, a center-of-gravity position calculation unit 315, and a falling prevention control unit 316 as illustrated in FIG. 7. The control processor 310 may be configured by using dedicated hardware such as an application specific integrated circuit (ASIC) or a field-programmable gate array (FPGA) in which these control functions are implemented.

The movement control unit 311 outputs a control command to the movable carriage drive unit 301 and controls the movement of the movable carriage portion 140 on the traveling surface, based on the forward information (the image captured by the camera 205 and the information on the distance measured by the distance sensor 206) acquired by the acquisition unit 306. The lifting control unit 312 outputs a control command to the lift drive unit 302, the distal end support mechanism drive unit 304, and the auxiliary leg drive unit 303 such that the load such as the pallet is lifted by the lift portion 120 while balancing by supporting the load with the fork portion 100, and the lifting control unit 312 controls the operations of the lift portion 120, the distal end support mechanism portion 180, and the auxiliary leg portion 160.

The step detection unit 313 detects a step on the traveling surface on which the movable carriage portion 140 is moved, based on the forward information (the image captured by the camera 205 and the information on the distance measured by the distance sensor 206) acquired by the acquisition unit 306. The step climbing control unit 314 outputs a control command to the lift drive unit 302, the distal end support mechanism drive unit 304, and the auxiliary leg drive unit 303 so as to climb the step detected by the step detection unit 313, and controls the operations of the distal end support mechanism portion 180 and the auxiliary leg portion 160.

The center-of-gravity position calculation unit 315 calculates the position of the center of gravity of the transport device that transports the load, based on the weight of the load detected by the load weight detection unit 305. The falling prevention control unit 316 determines whether or not transport device falls when transporting the load, based on the position of the center of gravity calculated by the center-of-gravity position calculation unit 315 and the movement acceleration/deceleration of the movable carriage portion 140 set in advance, and performs control to prevent the falling. The control to prevent the falling is, for example, control to bring the distal end support mechanism portion 180, which is in the non-contact state with the traveling surface, into contact with the traveling surface, control to move the auxiliary leg portion 160 such that the auxiliary wheels 163 closer to the rear come into contact with the traveling surface behind the drive wheels 143, or control to reduce the movement acceleration/deceleration of the movable carriage portion 140.

The transport device of the embodiment has the above-described structure and control system so as to be capable of performing various operations necessary for transporting a load in an unmanned manner. In the following, in the operations of the transport device of the embodiment, the operation of the transport device climbing the step will be described.

Figure 8A:
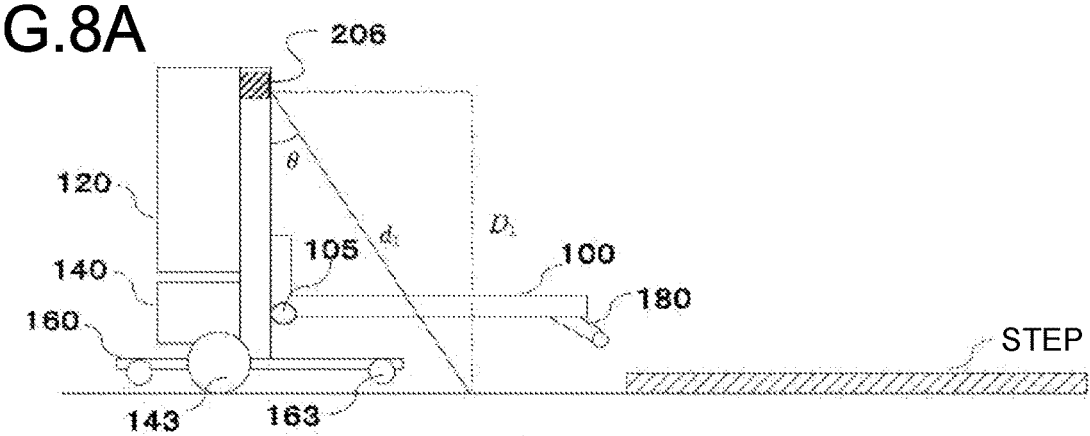
FIGS. 8A and 8B are schematic views illustrating a step climbing operation.
Figure 8B:
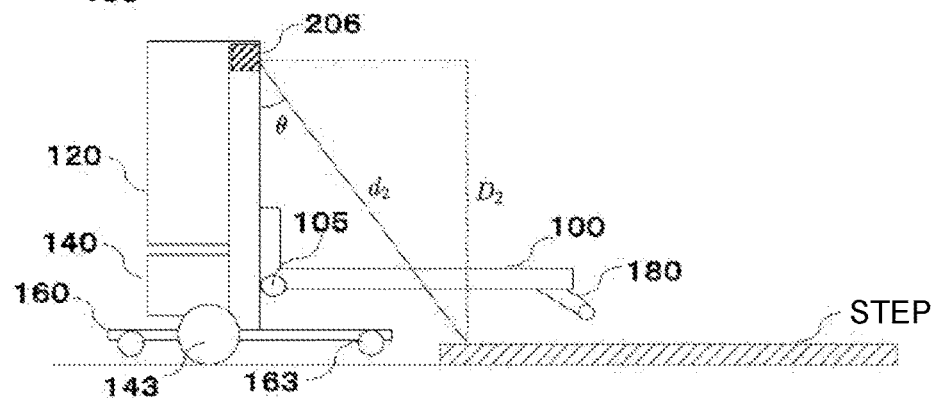

FIGS. 8A and 8B describe a method of detecting a step of the transport device and a method of determining whether or not the transport device can climb the step. A case where the distance sensor 206 is attached to the upper portion of the transport device is considered.

The distance sensor 206 is, for example, a laser rangefinder.

As illustrated in FIG. 8A, the distance sensor 206 detects a distance between the traveling surface and the distance sensor 206 in a direction of an angle θ with respect to a direction perpendicular to the traveling surface. Here, a distance $D_1$ between the traveling surface and the distance sensor 206 in a direction perpendicular to the distance sensor 206 is obtained as $D_1=d_1 \cos θ$. As illustrated in FIG. 8B, when the transport device is moved forward and the distance sensor 206 detects a step, the distance sensor 206 detects a distance $d_2$ between the step and the distance sensor 206 in the direction of the angle θ with respect to the direction perpendicular to the traveling surface. Here, a distance $D_2$ between the step and the distance sensor 206 in the direction perpendicular to the distance sensor 206 is obtained as $D_2=d_2 \cos θ$. A height h of the step is obtained as $h=D_1-D_2$.

The step climbing control unit 314 determines whether or not the transport device can climb the step. The step climbing control unit 314 performs the determination based on the height h of the step detected by the distance sensor 206, the weight of the transport device, the maximum torque that the drive wheel 143 can output, and the radius of the drive wheel 143. The step climbing control unit 314 calculates the torque of the drive wheel 143 required for climbing the step, by using the estimated values of the weight and the position of the center of gravity of the transport device estimated in advance from CAD data or the like and the height h of the step detected by the distance sensor 206.

It is assumed that a force F is applied in the direction perpendicular to the traveling surface, at a contact point between the step and the drive wheel 143. Assuming that the radius of the drive wheel 143 is r, the torque τ required for the transport device to climb the step can be estimated to be $τ=F\sqrt{r^2-(r-h)^2}$. In a case where the maximum torque of the drive motor 142 exceeds this estimated value, the step climbing control unit 314 determines that the transport device can climb the step.

The step climbing control unit 314 determines whether or not the drive wheels 143 have come into contact with the step. The step climbing control unit 314 calculates the distance between the drive wheel 143 and the step based on the information on the step detected by the distance sensor 206, the speed of the drive wheel 143, and the diameter of the drive wheel 143.

When the distance sensor 206, which has detected a flat surface on the traveling surface, detects a step on the traveling surface, the distance detected by the distance sensor 206 is changed. The step climbing control unit 314 calculates the distance between the drive wheel 143 and the step based on the output of the distance sensor 206 and the distance between the distance sensor 206 and the drive wheel 143.

Next, the step climbing control unit 314 measures the rotation speed (rad/s) of the drive wheel 143 using the encoder of the drive motor 142. A rotation distance $R_d$ (rad) of the drive wheel 143 when the step is detected is obtained from the rotation speed of the drive wheel 143. By multiplying the rotation distance of the drive wheel 143 by the radius r of the drive wheel 143, the distance moved forward in the traveling direction is obtained as $R_d r$. When the distance $R_d r$ becomes larger than the calculated distance between the drive wheel 143 and the step, the step climbing control unit 314 determines that the drive wheel 143 is in contact with the step.

Figure 9A:
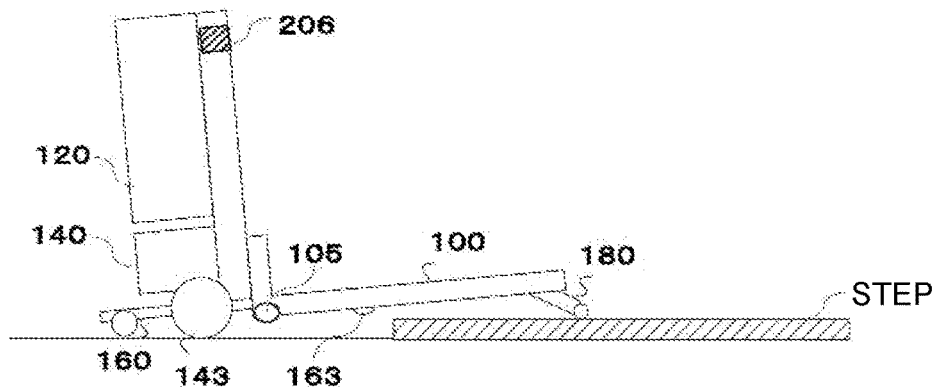
FIGS. 9A and 9B are schematic views illustrating the step climbing operation.
Figure 9B:
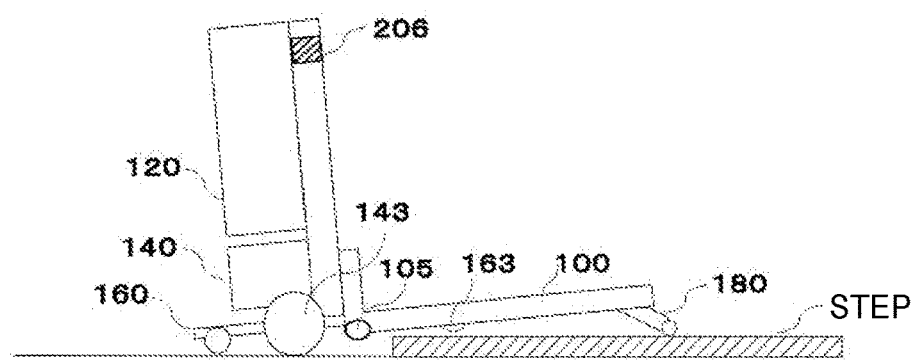

FIGS. 9A and 9B describes the operation of the auxiliary leg portion 160 of the transport device climbing the step.

As illustrated in FIG. 9A, when the transport device approaches the step, the step climbing control unit 314 lowers the fork portion 100 while the distal end support mechanism portion 180 is located on the step. When the fork portion 100 is lowered, the distal end support mechanism portion 180 comes into contact with the upper surface of the step. When the fork portion 100 is further lowered while the distal end support mechanism portion 180 is in contact with the upper surface of the step, the auxiliary wheels 163 closer to the front on the auxiliary leg portion 160 float from the traveling surface. Next, as illustrated in FIG. 9B, when the auxiliary wheels 163 closer to the front on the auxiliary leg portion 160 float to a position higher than the step, the drive wheels 143 move forward and approach the step, so that the auxiliary wheels 163 closer to the front on the auxiliary leg portion 160 are located on the step.

Figure 10:
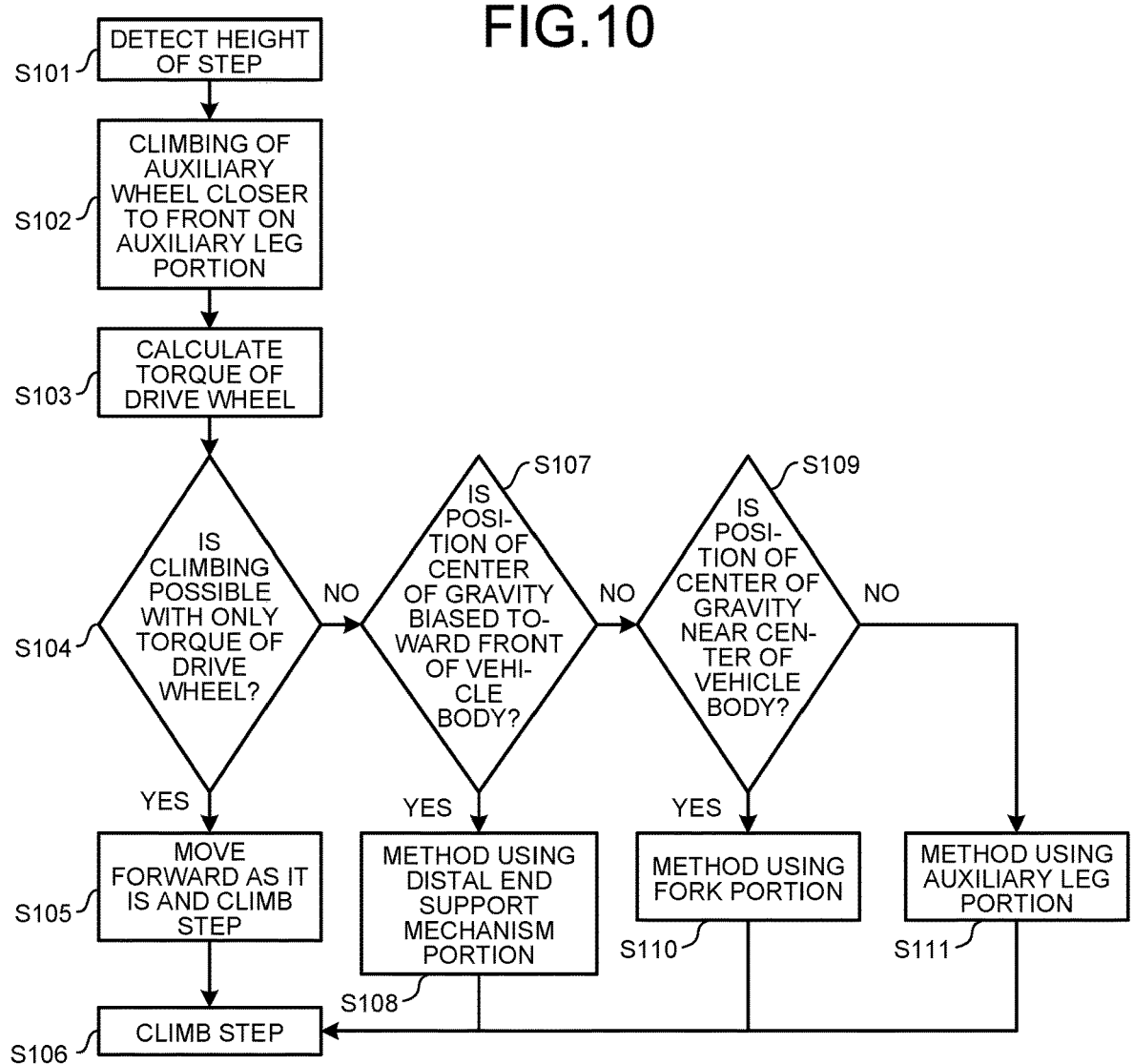
FIG. 10 is a flowchart illustrating a processing flow by a step climbing control unit.

FIG. 10 illustrates a flowchart of the step climbing operation of the transport device.

First, the transport device approaches the step, and the distance sensor 206 detects the height of the step. This is the state illustrated in FIGS. 8A and 8B (S101).

Next, the auxiliary wheels 163 on the auxiliary leg portion 160 and close to the front are located on the step. This is the state illustrated in FIGS. 9A and 9B (S102).

Next, the center-of-gravity position calculation unit 315 calculates the position of the center of gravity of the transport device loaded with the load. Further, the step climbing control unit 314 calculates the maximum torque of the drive wheels 163 (S103).

The step climbing control unit 314 determines whether or not the drive wheels 163 can climb the step based on the height of the step, the position of the center of gravity of the transport device loaded with the load, and the maximum torque of the drive wheels 163 (S104).

In a case where the drive wheels 163 can climb the step, the transport device is moved forward and climbs the step (S105), and the process is ended (S106).

In a case where it is determined in S104 that the drive wheels 163 cannot climb the step, the step climbing control unit 314 determines whether or not the position of the center of gravity of the transport device loaded with the load is biased toward the front of the vehicle body (S107).

In a case where the position of the center of gravity of the transport device loaded with the load is biased toward the front of the vehicle body, the step climbing control unit 314 performs control such that the transport device climbs the step by using a method using the distal end support mechanism portion 180 (S108).

In a case where the position of the center of gravity of the transport device loaded with the load is not biased toward the front of the vehicle body, the step climbing control unit 314 determines whether or not the position of the center of gravity of the transport device loaded with the load is near the center of the vehicle body (S109).

In a case where the position of the center of gravity of the transport device loaded with the load is near the center of the vehicle body, the step climbing control unit 314 performs control such that the transport device climbs the step by using a method using the fork portion 100 (S110).

In a case where the position of the center of gravity of the transport device loaded with the load is not near the center of the vehicle body, the step climbing control unit 314 performs control such that the transport device climbs the step by using a method using the auxiliary leg portion 160 (S111).

The method using the distal end support mechanism portion 180 in S108, the method using the fork portion 100 in S110, and the method using the auxiliary leg portion 160 in S111 which are for the transport device to climb the step will be described in detail below.

Figure 11:
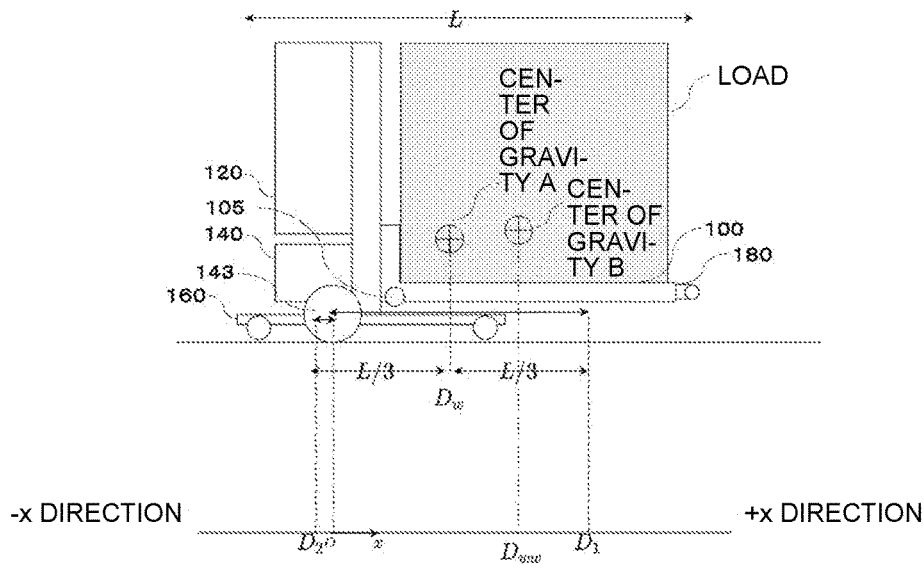
FIG. 11 is a schematic view illustrating determination of the step climbing operation.

FIG. 11 describes a determination as to which of the above-described three methods of climbing the step is selected by the step climbing control unit 314.

FIG. 11 is a diagram considering the x axis along the side surface of the transport device, with the rotation shaft of the drive wheel 143 of the transport device as O. For example, it is assumed that the center of gravity of the transport device with no load is a center of gravity A and the position on the x axis is $D_w$. For example, it is assumed that the length of the transport device in the x-axis direction is L. It is assumed that a point at L/3 in the +x direction from $D_w$ is $D_1$, and a point at L/3 in the −x direction from $D_w$ is $D_2$.

Next, a case where a load is loaded on the transport device is considered. It is assumed that the center of gravity of the transport device loaded with the load is a center of gravity B and the position on the x axis is $D_{ww}$.

For example, in a case where the position $D_{ww}$ of the center of gravity B is on the +x direction side of $D_1$, the center of gravity B is biased toward the front of the vehicle body of the transport device. Therefore, the step climbing control unit 314 selects a method of climbing the step using the distal end support mechanism portion 180.

For example, in a case where the position $D_{ww}$ of the center of gravity B is between $D_1$ and $D_2$, the center of gravity B is near the center of the vehicle body of the transport device. Therefore, the step climbing control unit 314 selects a method of climbing the step using the fork portion 100.

For example, in a case where the position $D_{ww}$ of the center of gravity B is on the −x direction side of $D_2$, the center of gravity B is biased toward the rear of the vehicle body of the transport device. Therefore, the step climbing control unit 314 selects a method of climbing the step using the auxiliary leg portion 160.

The step climbing control unit 314 has selected which method of climbing the step to use depending on the positional relationship between the position $D_{ww}$ of the center of gravity B and $D_1$ and $D_2$, but this selection criterion may be changed. For example, in a case where the position $D_{ww}$ of the center of gravity is on the +x direction side of $D_1$, the step climbing control unit 314 may select the method of climbing the step using the fork portion 100.

Further, it has been assumed that the point at L/3 in the +x direction from the position $D_w$ of the center of gravity A is $D_1$, and the point at L/3 in the −x direction from $D_w$ is $D_2$, but the distances from the position $D_w$ of the center of gravity to $D_1$ and $D_2$ may be changed.

Figure 12A:
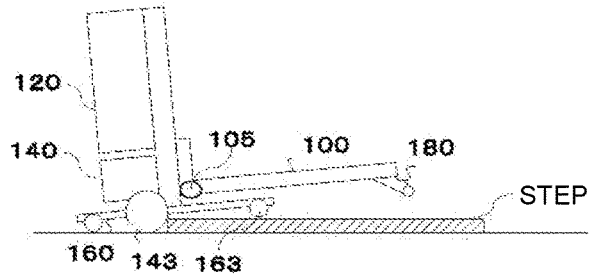
FIGS. 12A to 12C are schematic views illustrating a step climbing operation using a distal end instruction mechanism portion.
Figure 12B:
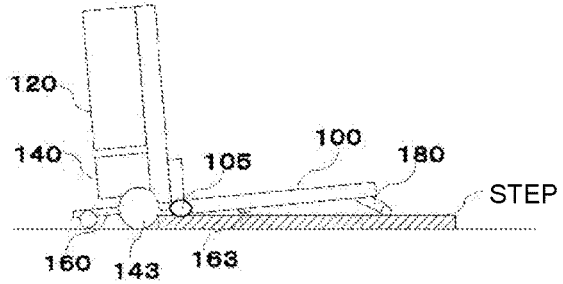
Figure 12C:
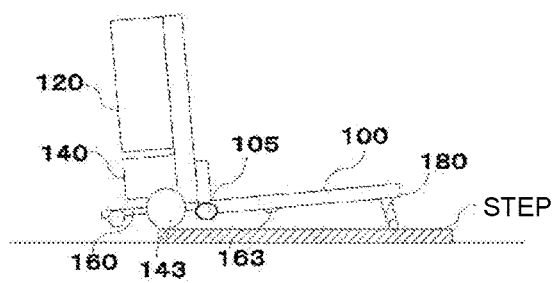

With reference to FIGS. 12A to 12C, the operation of the transport device of the embodiment climbing the step using the distal end support mechanism portion 180 will be described.

First, in a state where the auxiliary wheels 163 closer to the front on the auxiliary leg portion 160 have climbed the step (refer to FIG. 9B), the transport device is moved forward toward the step to cause the drive wheels 143 to come into contact with the step. When the drive wheels 143 have come into contact with the step, the transport device stops the operation of moving forward (refer to FIG. 12A).

The transport device lowers the fork portion 100. When the transport device lowers the fork portion 100, the distal end support mechanism portion 180 comes into contact with the step. When the distal end support mechanism portion 180 has come into contact with the step, the transport device brakes the wheels 184 of the distal end support mechanism portion 180 (refer to FIG. 12B).

At the same time as rotating the joint of the distal end support mechanism portion 180, the drive wheels 143 are moved forward toward the step. Since two kinds of force, the torque of the drive wheels 143 and the pulling force generated by the distal end support mechanism portion 180 are generated at the same time, it is possible to climb the step with a larger force than when the transport device operates only the drive wheels 143 to climb the step (refer to FIG. 12C).

In a case where the wheels 184 are not present at the distal end of the distal end support mechanism portion 180, a portion that can come into contact with the step may be brought into contact with the step.

Figure 13:
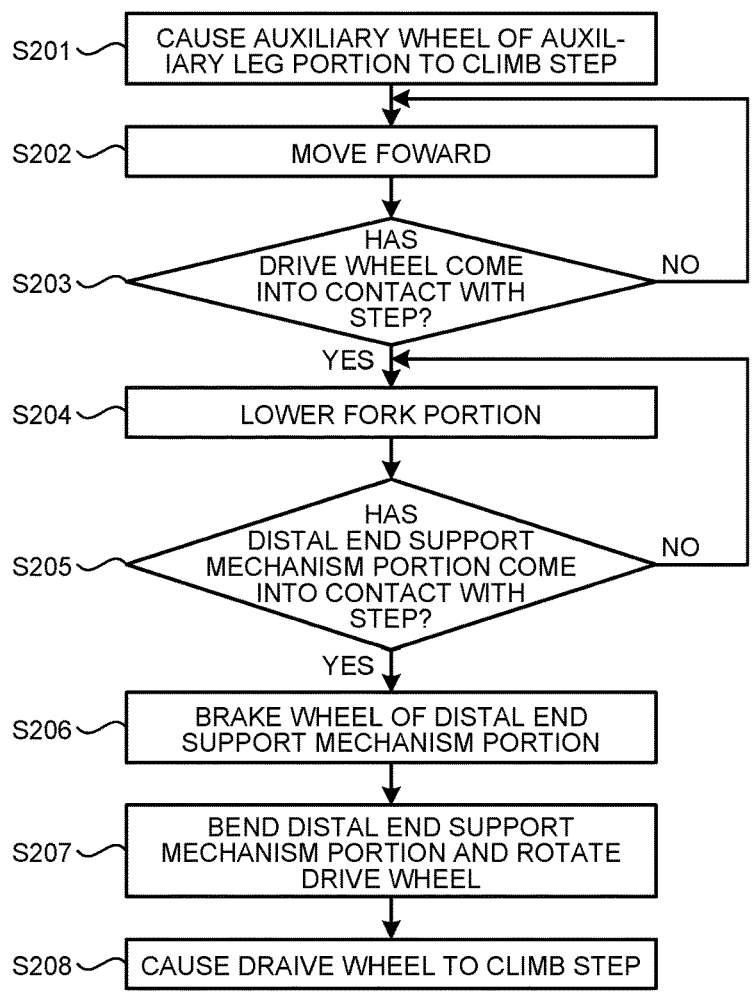
FIG. 13 is a flowchart illustrating a flow of the step climbing operation using the distal end instruction mechanism portion.

Next, a specific example of the process executed by the control function of the control processor 310 will be described. First, with reference to FIG. 13, the process by the movement control unit 311 and the step climbing control unit 314 in the above-described operation of the transport device climbing the step using the distal end support mechanism portion 180 will be described. FIG. 13 is a flowchart illustrating a flow of the process by the movement control unit 311 and the step climbing control unit 314 in the operation of climbing the step using the distal end support mechanism portion 180.

First, in a state where the auxiliary wheels 163 closer to the front on the auxiliary leg portion 160 have climbed the step (S201), the movement control unit 311 moves the drive wheels 143 of the transport device forward toward the step (S202). The step climbing control unit 314 determines whether or not the drive wheels 143 have come into contact with the step.

The step climbing control unit 314 determines whether the drive wheels 143 have come into contact with the step by using the distance between the step and the transport device, which is detected by the distance sensor 206, and the distance traveled by the drive wheels 143, which is calculated based on the radius of the drive wheel 143 (S203). In a case where the drive wheels 143 are not in contact with the step, the movement control unit 311 moves the drive wheels 143 forward toward the step. In a case where the drive wheels 143 have come into contact with the step, the movement control unit 311 lowers the fork portion 100 of the transport device toward the step (S204). The step climbing control unit 314 determines whether or not the distal end support mechanism portion 180 has come into contact with the step. The step climbing control unit 314 determines whether or not the distal end support mechanism portion 180 has come into contact with the step based on the height of the step, the position of the fork portion 100, the amount of rotation of the distal end support mechanism portion 180, and the posture of the transport device (S205). In a case where the distal end support mechanism portion 180 is not in contact with the step, the fork portion 100 is continuously lowered toward the step. In a case where the distal end support mechanism portion 180 has come into contact with the step, the wheels 184 of the distal end support mechanism portion 180 is braked (S206). At the same time as rotating the joint between the distal end support mechanism portion 180 and the fork portion 100, the drive wheels 143 are moved forward toward the step (S207). When the drive wheels 143 have climbed the step, the step climbing operation of the transport device is ended (S208).

Figure 14A:
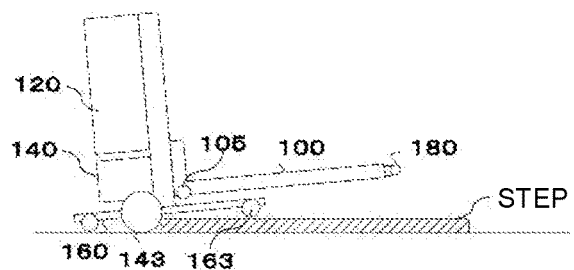
FIGS. 14A to 14C are schematic views illustrating a step climbing operation using a fork portion.
Figure 14B:
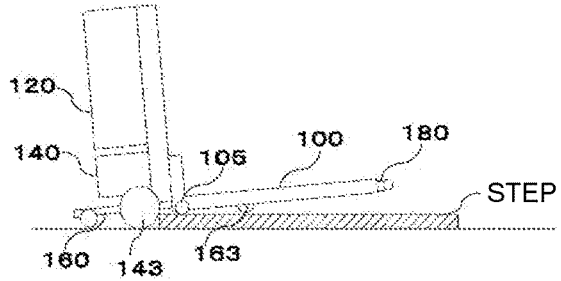
Figure 14C:
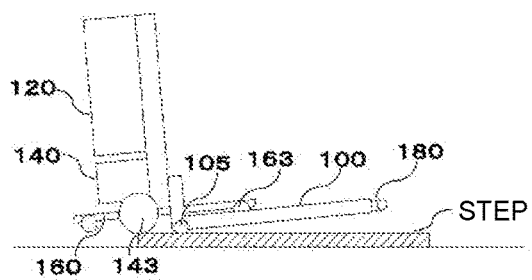

With reference to FIGS. 14A to 14C, the operation of the transport device of the embodiment climbing the step using the fork portion 100 will be described. Since the load applied to the drive wheels 143 can be reduced by supporting the weight of the transport device with the fork portion 100, the transport device can climb the step. This is effective in a case where the load applied to the transport device is smaller than the force exerted by the fork portion 100.

First, in a state where the auxiliary wheels 163 closer to the front on the auxiliary leg portion 160 have climbed the step (refer to FIG. 9B), the transport device is moved forward toward the step to cause the drive wheels 143 to come into contact with the step. When the drive wheels 143 have come into contact with the step, the transport device stops the operation of moving forward (refer to FIG. 14A).

The transport device lowers the fork portion 100. When the transport device lowers the fork portion 100, wheels 105 come into contact with the step (refer to FIG. 14B).

The drive wheels 143 are rotated at the same time as further lowering the fork portion 100. When the wheels 105 of the fork portion 100 have come into contact with the step, the load applied to the drive wheels 143 is reduced, so that the climbing is completed (refer to FIG. 14C).

Figure 15:
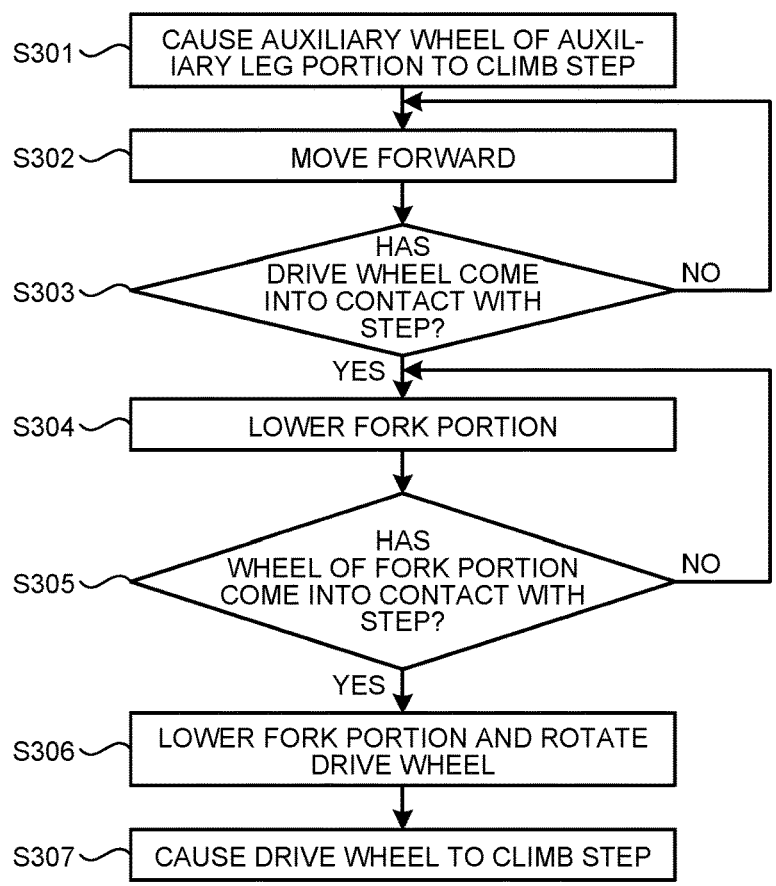
FIG. 15 is a flowchart illustrating a flow of the step climbing operation using the fork portion.

Next, a specific example of the process executed by the control function of the control processor 310 will be described. First, with reference to FIG. 15, the process by the movement control unit 311 and the step climbing control unit 314 in the above-described operation of the transport device climbing the step using the fork portion 100 will be described. FIG. 15 is a flowchart illustrating a flow of the process by the movement control unit 311 and the step climbing control unit 314 in the operation of climbing the step using the fork portion 100.

First, in a state where the auxiliary wheels 163 closer to the front on the auxiliary leg portion 160 have climbed the step (S301), the movement control unit 311 moves the drive wheels 143 of the transport device forward toward the step (S302). The step climbing control unit 314 determines whether or not the drive wheels 143 have come into contact with the step. The step climbing control unit 314 determines whether the drive wheels 143 have come into contact with the step by using the distance between the step and the transport device, which is detected by the distance sensor 206, and the distance traveled by the drive wheels 143, which is calculated based on the radius of the drive wheel 143 (S303). In a case where the drive wheels 143 are not in contact with the step, the movement control unit 311 moves the drive wheels 143 forward toward the step. In a case where the drive wheels 143 have come into contact with the step, the movement control unit 311 lowers the fork portion 100 of the transport device toward the step (S304). The step climbing control unit 314 determines whether or not the wheels 105 of the fork portion 100 have come into contact with the step. The step climbing control unit 314 determines whether or not the wheels 105 have come into contact with the step based on the position of the fork portion 100 and the posture (tilt status) of the transport device (S305). In a case where the wheels 105 of the fork portion 100 are not in contact with the step, the fork portion 100 is continuously lowered toward the step. In a case where the wheel 105 of the fork portion 100 have come into contact with the step, the drive wheels 143 are rotated while the fork portion 100 is further lowered (S306). When the drive wheels 143 have climbed the step, the step climbing operation of the transport device is ended (S307).

Figure 16A:
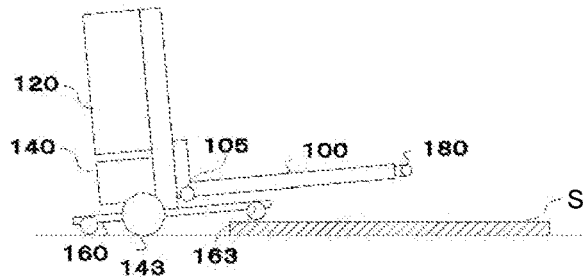
FIGS. 16A to 16C are schematic views illustrating a step climbing operation using an auxiliary leg portion.
Figure 16B:
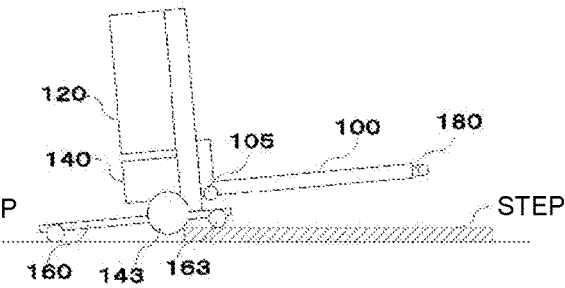
Figure 16C:
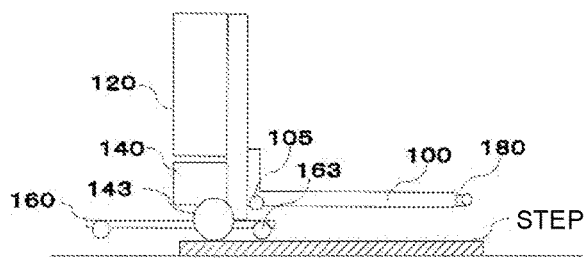

With reference to FIGS. 16A to 16C, the operation of the transport device of the embodiment climbing the step using the auxiliary leg portion 160 will be described.

First, in a state where the auxiliary wheels 163 closer to the front on the auxiliary leg portion 160 have climbed the step (refer to FIG. 9B), the auxiliary wheels 163 are braked (refer to FIG. 16A).

The transport device is moved forward along the auxiliary leg portion 160. The drive wheels 143 of the transport device are moved away from the traveling surface, are moved forward along the auxiliary leg portion 160, and come into contact with the step (refer to FIG. 16B).

After the drive wheels 143 of the transport device have come into contact with the step, the drive wheels 143 are rotated. The climbing the step by the drive wheels 143 is completed (refer to FIG. 16C).

Figure 17:
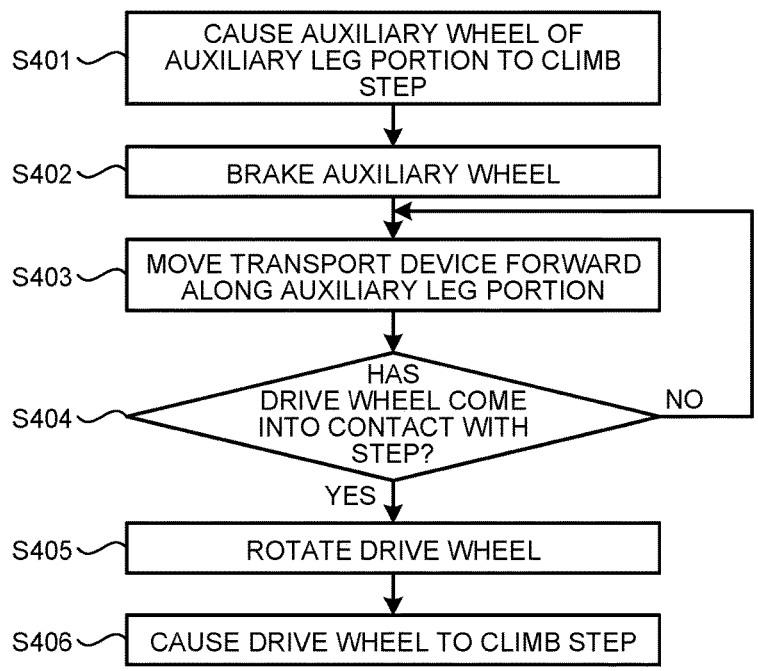
FIG. 17 is a flowchart illustrating a flow of the step climbing operation using the auxiliary leg portion.

Next, a specific example of the process executed by the control function of the control processor 310 will be described. First, with reference to FIG. 17, the process by the movement control unit 311 and the step climbing control unit 314 in the above-described operation of the transport device climbing the step using the auxiliary leg portion 160 will be described. FIG. 17 is a flowchart illustrating a flow of the process by the movement control unit 311 and the step climbing control unit 314 in the operation of climbing the step using the auxiliary leg portion 160.

First, in a state where the auxiliary wheels 163 closer to the front on the auxiliary leg portion 160 have climbed the step (S401), the movement control unit 311 brakes the auxiliary wheels 163 of the auxiliary leg portion 160 of the transport device (S402). The step climbing control unit 314 moves the transport device forward along the auxiliary leg portion 160 (S403). The step climbing control unit 314 determines whether or not the drive wheels 143 have come into contact with the step (S404). In a case where the drive wheels 143 are not in contact with the step, the step climbing control unit 314 further moves the transport device forward along the auxiliary leg portion 160. In a case where the drive wheels 143 have come into contact with the step, the step climbing control unit 314 rotates the drive wheels 143 (S405). When the drive wheels 143 have climbed the step, the step climbing operation of the transport device is ended (S406).

In addition, the method using the distal end support mechanism portion 180, the method using the fork portion 100, and the method using the auxiliary leg portion 160 which are for the transport device to climb the step have been described, but in a case where the auxiliary leg portion 160 is not provided in the transport device, the transport device cannot climb the step by using the auxiliary leg portion 160. Further, in a case where the distal end support mechanism portion 180 is not provided in the transport device, the transport device cannot climb the step by using the distal end support mechanism portion 180.

Up to this point, the case where the length of the step in the horizontal direction is such that the distal end support mechanism portion 180 and the fork portion 100 can come into contact with the step has been described, but a method of the transport device climbing the step in a case where the length of the step is short and the height of the step is lower than that of the transport device will be described.

Figure 18A:
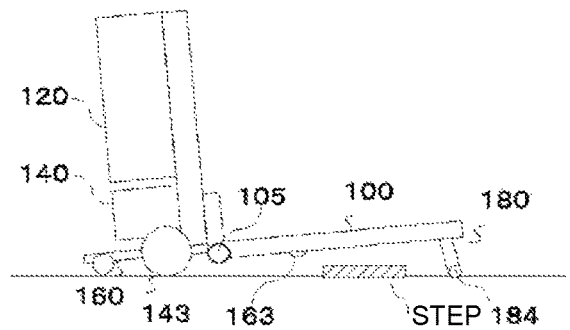
FIGS. 18A to 18C are schematic views illustrating a step climbing operation in a case where the length of a step plane is short.
Figure 18B:
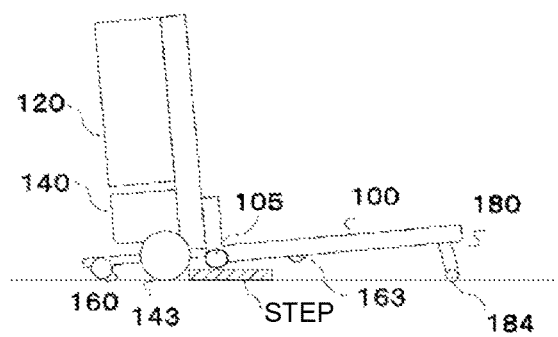
Figure 18C:
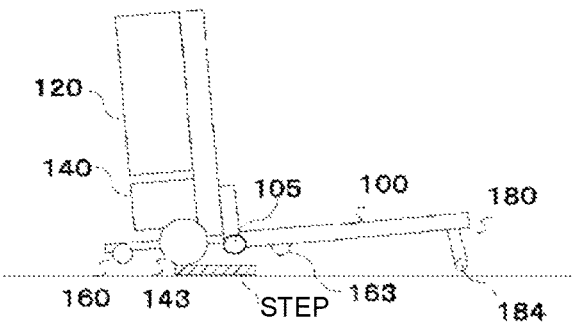

With reference to FIGS. 18A to 18C, a method of the transport device climbing the step in a case where the length of the step is short in the horizontal direction and the height of the step is sufficiently lower than that of the transport device will be described.

First, since the height of the step is sufficiently lower than that of the transport device, a case where the lift portion 100 is located above the step is considered. When the transport device lowers the fork portion 100, the wheels 184 of the distal end support mechanism portion 180 come into contact with the traveling surface beyond the step. At this time, the auxiliary wheels 163 closer to the front on the auxiliary leg portion 160 are in a state where it is moved away from the traveling surface (refer to FIG. 18A). The drive wheels 143 are moved forward toward the step (refer to FIG. 18B). After the drive wheels 143 have come into contact with the step, the drive wheels 143 are further rotated to cause the transport device to climb the step, and the operation is completed (refer to FIG. 18C). In a case where the height of the step is lower than that of the transport device, it is possible to climb the step with only the force of the drive wheels 143.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A transport device comprising:
    a vehicle body including
        a fork portion that supports a load,
        a lift portion that drives the fork portion up and down,
        a movable carriage portion that supports the lift portion, and is movable on
    a traveling surface by driving a drive wheel, and
        an auxiliary leg portion that is provided in the movable carriage portion, is movable along a longitudinal direction of the fork portion, and has an auxiliary wheel having a variable position with respect to the movable carriage portion; and
    a processor that
        calculates a position of a center of gravity of the vehicle body that is transporting the load; and
        in a case where a step is present on the traveling surface, controls operations of the lift portion, the movable carriage portion, and the auxiliary leg portion such that the movable carriage portion climbs the step, based on the position of the center of gravity calculated by the calculation unit.

2. The device according to claim 1, wherein the processor causes the fork portion to come into contact with the traveling surface to cause the auxiliary wheel of the auxiliary leg portion to climb the step.

3. The device according to claim 1, wherein
    the fork portion further includes a wheel, and
    the processor causes the lift portion to drive the fork portion downward and causes the wheel to come into contact with the step to cause the drive wheel of the movable carriage portion to climb the step.

4. The device according to claim 1, wherein the processor brakes the auxiliary wheel of the auxiliary leg portion and moves the movable carriage portion along the auxiliary leg portion to cause the drive wheel of the movable carriage portion to climb the step.

5. The device according to claim 1, further comprising a distal end support mechanism portion that is provided closer to a distal end on the fork portion, and switches between a non-contact state with the traveling surface and a contact state with the traveling surface.

6. The device according to claim 5, wherein the processor causes the lift portion to drive the fork portion downward and causes the distal end support mechanism portion to come into contact with the step to cause the drive wheel of the movable carriage portion to climb the step.

7. The device according to claim 1, wherein the processor acquires forward information indicating a situation in front of the fork portion.

8. The device according to claim 7, wherein the processor detects the step on the traveling surface based on the forward information.

9. A control method for causing the a transport device to climb a step,
    the transport device comprising:
        a vehicle body including
            a fork portion that supports a load,
            a lift portion that drives the fork portion up and down,
            a movable carriage portion that supports the lift portion, and is movable on a traveling surface by driving a drive wheel, and
            an auxiliary leg portion that is provided in the movable carriage portion, is movable along a longitudinal direction of the fork portion, and has an auxiliary wheel having a variable position with respect to the movable carriage portion; and
        a processor that
            calculates a position of a center of gravity of the vehicle body that is transporting the load; and in a case where the step is present on the traveling surface, controls operations of the lift portion, the movable carriage portion, and the auxiliary leg portion such that the movable carriage portion climbs the step, based on the position of the center of gravity calculated by the calculation unit, the control method comprising:
- driving the fork portion downward;
- causing a wheel of the fork portion to come into contact with the step; and
- causing the drive wheel of the movable carriage portion to climb the step.

10. The method according to claim 9, comprising:
braking the auxiliary wheel of the auxiliary leg portion;
moving the movable carriage portion along the auxiliary leg portion; and
causing the drive wheel of the movable carriage portion to climb the step.

11. The method according to claim 9, comprising:
driving the fork portion downward;
causing a distal end support mechanism portion to come into contact with the step; and
causing the drive wheel of the movable carriage portion to climb the step.

12. A non-transitory computer program product comprising a non-transitory computer-readable medium including programmed instructions, the instructions causing a processor to perform control to cause a transport device to climb a step, the transport device comprising:
a vehicle body including
- a fork portion that supports a load,
- a lift portion that drives the fork portion up and down,
- a movable carriage portion that supports the lift portion, and is movable on a traveling surface by driving a drive wheel, and
- an auxiliary leg portion that is provided in the movable carriage portion, is movable along a longitudinal direction of the fork portion, and has an auxiliary wheel having a variable position with respect to the movable carriage portion; and the processor that
- calculates a position of a center of gravity of the vehicle body that is transporting the load; and
- in a case where the step is present on the traveling surface, controls operations of the lift portion, the movable carriage portion, and the auxiliary leg portion such that the movable carriage portion climbs the step, based on the position of the center of gravity calculated by the calculation unit, the instructions causing the processor to perform:
- driving the fork portion downward;
- causing a wheel of the fork portion to come into contact with the step; and
- causing the drive wheel of the movable carriage portion to climb the step.

13. The product according to claim 12, wherein the instructions cause the processor to perform:
braking the auxiliary wheel of the auxiliary leg portion;
moving the movable carriage portion along the auxiliary leg portion; and
causing the drive wheel of the movable carriage portion to climb the step.

14. The product according to claim 12, wherein the instructions cause the processor to perform:
driving the fork portion downward;
causing a distal end support mechanism portion to come into contact with the step; and
causing the drive wheel of the movable carriage portion to climb the step.

* * * * *